C. W. MEINECKE.
SPUTUM CUP AND HOLDER THEREFOR.
APPLICATION FILED MAR. 19, 1908.
963,454.
Patented July 5, 1910.
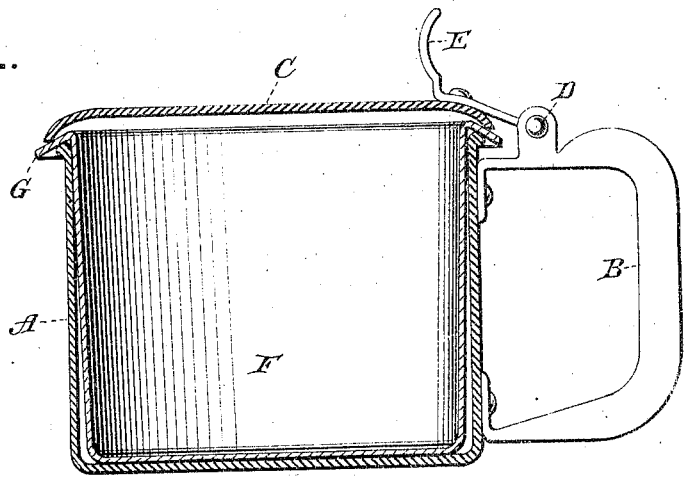
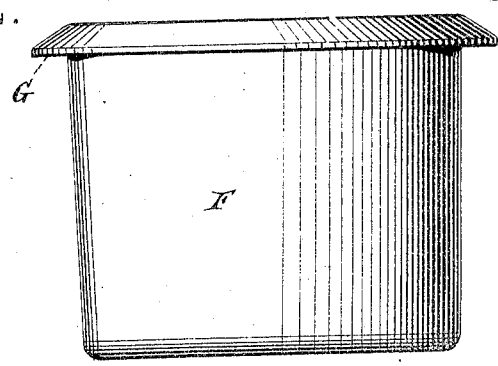
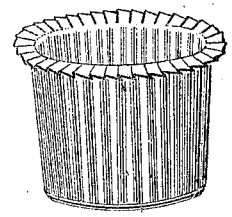
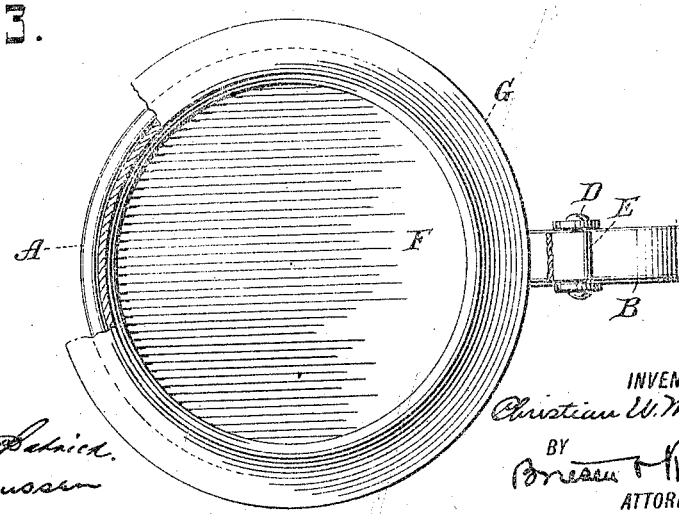
WITNESSES:
INVENTOR
Christian W. Meinecke
BY
ATTORNEYS

UNITED STATES PATENT OFFICE.

CHRISTIAN W. MEINECKE, OF JERSEY CITY, NEW JERSEY, ASSIGNOR TO WHITALL TATUM COMPANY, OF NEW YORK, N. Y., A CORPORATION OF NEW JERSEY.

SPUTUM-CUP AND HOLDER THEREFOR.

963,454.     Specification of Letters Patent.     Patented July 5, 1910.

Application filed March 19, 1908. Serial No. 422,150.

*To all whom it may concern:*

Be it known that I, CHRISTIAN W. MEINECKE, residing at Jersey City, county of Hudson, State of New Jersey, have invented a new and useful Improvement in Sputum-Cups and Holders Therefor, of which the following is a specification.

My invention relates to improvements to sputum cups and holders therefor and has for its object to provide such a holder with an interchangeable cup, which cup also serves to render more nearly air tight the junction of the cover with the rim of the holder, and also to prevent noise when the holder is being closed.

In the drawing Figure 1 is a sectional view of the holder containing the cup. Fig. 2 is a side elevation of the cup; Fig. 3 a plan view of the holder with cup in position, with parts broken away; and Fig. 4 a perspective view of another form of cup.

In the drawings A designates the holder, which may be of any desired shape, size or material. As shown in the drawing the holder is circular in cross-section, and is provided with a handle B, to which a cover C is hinged at D. The cover C is provided with a downwardly turned continuous rim as shown in Fig. 1. A finger piece is provided at E to permit the cover to be readily raised and also to limit the rearward movement of the cover. A cup F is inserted into this holder. This cup is preferably made of paper or similar fibrous material and may be made of any convenient size and shape, preferably being constructed so as to fit snugly within the interior of the holder. If made of round shape the cup is preferably made of material fluted into shape as shown in Fig. 4, this being the cheapest method of manufacturing a round cup.

The cup is provided with a flange preferably arranged so as to fit over the upper edge of the holder. This rim makes an almost air-tight connection between the cover C and the holder A, and thus prevents the germs in the cup from spreading. The flange serves also to prevent the cup from slipping down too far into the holder. The downwardly turned rim of the cover bends the flange downwardly, thus giving the cup a securer grip upon the holder, and making a more nearly perfect joint. Cups of various depths may be used, as a cup of less depth than the holder will be suspended by the flange. The flange serves also as a convenient handle for seizing the cup when it is to be removed and serves also to deaden the noise of the cover when it is closed down upon the holder.

As already stated both the holder and the cup may be made of any desired material. The cup is preferably made of enamel-ware, which is easily kept clean and resists the action of disinfectants. The lining is made preferably of a fibrous material which is easily burned in order that the contents of the cup may readily be destroyed after examination by the physician.

I claim as my invention:

A holder, a cover hinged thereon at a distance from its periphery and provided with a downwardly turned continuous rim extending beyond said holder, an interchangeable cup, an annular flange thereon forming an acute angle with the walls of said cup into which the rim of the holder is arranged to extend for supporting said cup in position in said holder.

In witness whereof I have hereunto set my hand in the presence of two witnesses.

CHRISTIAN W. MEINECKE.

Witnesses:
FRITZ V. BRIESEN,
FRANK F. KIRKPATRICK.